US012519988B2

(12) United States Patent
Stroffolino et al.

(10) Patent No.: US 12,519,988 B2
(45) Date of Patent: Jan. 6, 2026

(54) METHOD FOR REPLAYING LIVE VIDEO

(71) Applicant: Comcast Cable Communications, LLC, Philadelphia, PA (US)

(72) Inventors: Philip John Stroffolino, Media, PA (US); Arthur Jost, Mount Laurel, NJ (US); Jaikumar Subramanian, Devon, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 88 days.

(21) Appl. No.: 18/390,960

(22) Filed: Dec. 20, 2023

(65) Prior Publication Data

US 2025/0211804 A1    Jun. 26, 2025

(51) Int. Cl.
*H04N 21/231* (2011.01)
*H04N 21/2662* (2011.01)
*H04N 21/845* (2011.01)

(52) U.S. Cl.
CPC ....... *H04N 21/231* (2013.01); *H04N 21/2662* (2013.01); *H04N 21/8456* (2013.01)

(58) Field of Classification Search
CPC ............. H04N 21/231; H04N 21/2662; H04N 21/8456
See application file for complete search history.

(56) References Cited

U.S. PATENT DOCUMENTS 10,638,180 B1 * 4/2020 Pringle ................ H04N 21/262
2020/0186848 A1 * 6/2020 Ganti ............... H04N 21/23106

* cited by examiner

*Primary Examiner* — Anthony Bantamoi
(74) *Attorney, Agent, or Firm* — BakerHostetler

(57) ABSTRACT

Systems and methods described herein relate to storing and replaying live streaming content. A content recording system may provide virtual manifests to a playback device. The virtual manifests may facilitate a simulation of live streaming of content at a time other than the live streaming. The virtual manifests may be modified versions of the manifests generated during the live streaming of the content. The manifest generation time and location indicators of the content segments are modified to resemble a live stream. If a playback device requests manifests for the live streaming content at a later time, the playback device can display the content at the later time as if the content is being streamed live. This may assist in quality assurance procedures for live stream content.

20 Claims, 7 Drawing Sheets

METHOD FOR REPLAYING LIVE VIDEO

BACKGROUND

Live content streaming may include live streaming of content, such as a live broadcast of an event. While live streaming content may include the benefits of simultaneous, or near simultaneous viewing in relation to the event, live streaming content may also produce issues related to quality assurance. For example, live content may typically be stored for a short period of time, and then deleted. Thus, the ability to reproduce intermittent issues found by quality assurance or during live playback may be difficult. Likewise, re-tuning to live streams to recreate an issue experienced by a user may be inefficient.

Another challenge with true live playback is that each stream may receive different audio/video each time a test is started. To detect lip sync or other impacting issues, it may be valuable to have reference content with known characteristics for comparison. This may not be possible when the AV output changes for each run of the same test. These and other shortcomings are identified and addressed in this disclosure.

SUMMARY

Systems and methods described herein relate to storing and replaying live streaming content. A content recording system may access a content stream and store manifests and content segments associated with the content stream. The manifests may be successive manifests, which may update one another (e.g., for linear content). The content recording system may store different versions of a given content segment, such as different resolution versions. The content recording system may provide virtual manifests to a playback device. The virtual manifests may facilitate a simulation of live streaming of the content at a time other than the live streaming. The virtual manifests may be modified versions of the manifests generated during the live streaming of the content. The manifest generation time and location indicators of the content segments are modified to resemble a live stream. Thus, when a playback device requests manifests for the live streaming content at a later time, the playback device can display the content at the later time as if the content is being streamed live. This may assist in quality assurance procedures for live stream content. The playback device may display content segments as if the content is live streamed.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

The following drawings show generally, by way of example, but not by way of limitation, various examples discussed in the present disclosure. In the drawings.

DETAILED DESCRIPTION OF ILLUSTRATIVE EMBODIMENTS

Systems and methods are described herein for replaying live streaming content. Linear content streaming may experience difficulties in playback by a playback device during the original or live stream of the content. A first playback device, at a particular time, may download and display different content segments, experience particular network conditions, and may incorporate particular audio or subtitle content. The playback experience of the first playback device may be different compared to a second playback device, either at the same time or at a different time. Thus, assessing any particular issues experienced by the first playback device during display of the content may be difficult.

According to the present disclosure, a content recording system for live content may provide access to stored live content, and may facilitate playback of the stored live content as if the live content was streamed live. The content recording system may also collect the manifests and the content during the live or original streaming. A harvester of the content recording system may request and retrieve manifests and content segments associated with the live streamed content. The harvester may collect and store the manifests, which may be used by the content recording system to generate the virtual manifests. The harvester may also collect and store the content segments associated with the live content, which may be used to recreate or simulate the live streaming of the content.

The content recording system may generate virtual manifests that may simulate linear or growing manifests created for the content during its original or live stream. The virtual manifest may include information indicative of storage locations of content segments for the content, where the content segments are recorded during the live or original streaming of the content. The virtual manifests may simulate the contents and generation times of the manifests created for the content during the live or original streaming. When a playback device requests the manifests or content from the content recording system, the provided manifests or content may simulate the live streaming of the content.

Figure 1:
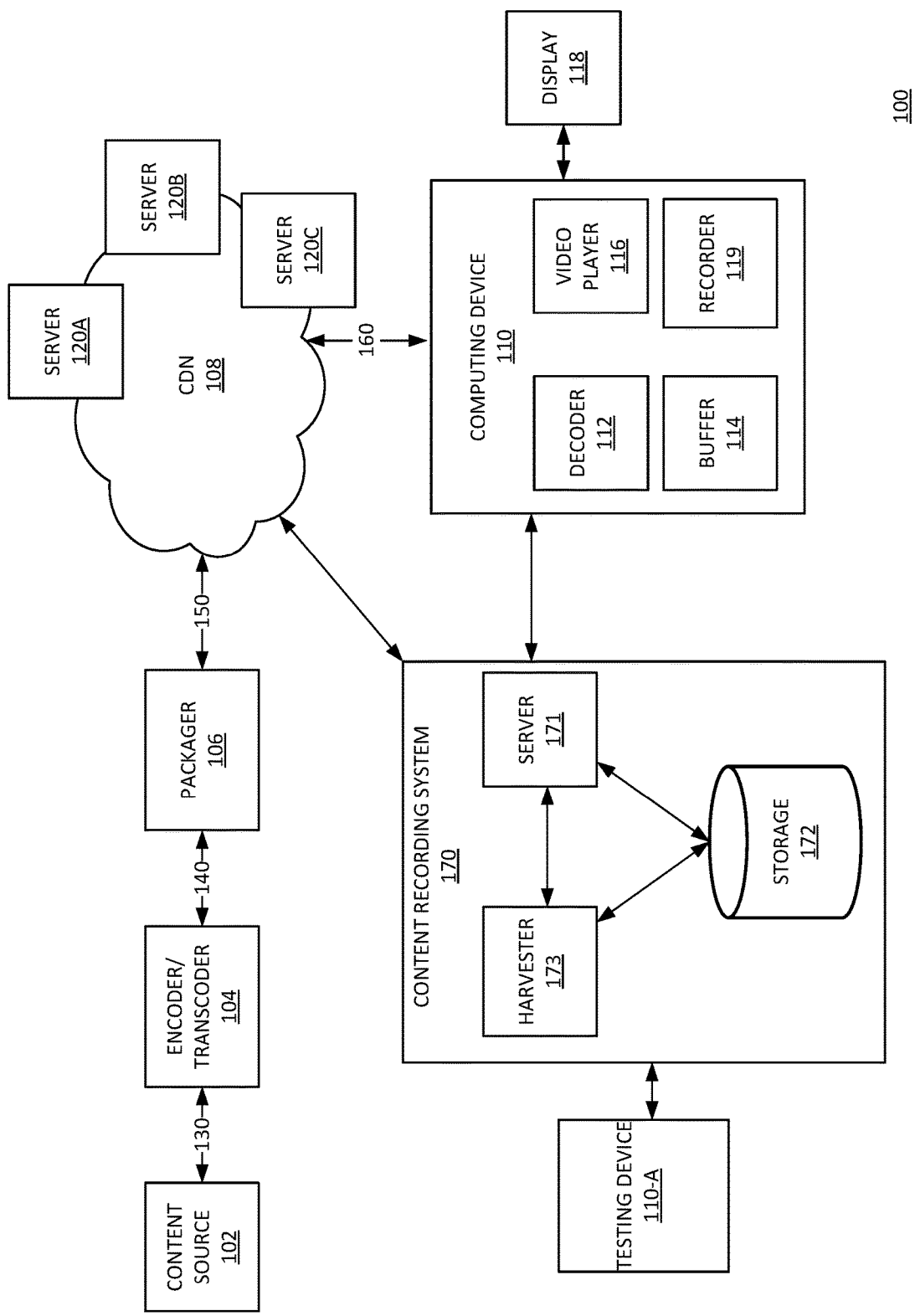
FIG. 1 shows an example system.

FIG. 1 shows a system 100 for delivering content. The example system 100 may comprise a content source 102, an encoder/transcoder 104, a packager 106, a content delivery network (CDN) 108, a computing device 110, a content recording system 170, or any combination thereof. The techniques for video processing described herein are applicable to any content delivery method including but not limited to Dynamic Adaptive Streaming over HTTP (DASH), HTTP Live Streaming (HLS), and/or adaptive bit rate (ABR) streaming.

The computing device 110 may comprise a television, a monitor, a laptop, a desktop, a smart phone, a set-top box, a streaming-video player, a cable modem, a gateway, a tablet, a wearable computing device, a mobile computing device, any computing device configured to receive and/or render content, the like, and/or any combination of the foregoing. The computing device 110 may comprise a decoder 112, a buffer 114, a video player 116, and a digital video recorder (DVR) 119. The computing device 110 (e.g., the video player 116) may be communicatively connected to a display 118. The display 118 may be a separate and discrete component from the computing device 110, such as a television display connected to a set-top box. The display 118 may be integrated with the computing device 110. The decoder 112, the video player 116, the buffer 114, the DVR 119, and the display 118 may be realized in a single device, such as a laptop or mobile device. The decoder 112 may decompress/decode encoded video data. The encoded video data may be received from the encoder/transcoder 104, the packager 106, or the CDN 108.

The content source 102 may comprise a source feed of content from a provider. The content source 102 may comprise a broadcast source, a service provider (e.g., a cable television service provider), a headend, a video on-demand server, a cable modem termination system, the like, and/or any combination of the foregoing. The content source 102 may send content 130 to the encoder/transcoder 104. The content 130 may comprise, for example, linear content, which may further comprise a program, a television show, a movie, a sports event broadcast, or the like. Linear content may include newer content segments of the content are made available to playback devices for a period of time, while older content segments of the content may be made unavailable to the playback device (e.g., the content segments are provided linearly). The content 130 may comprise video frames or other images. The content 130 may comprise video frames in a Moving Picture Experts Group (MPEG) Single Program Transport Stream (MPEG-SPTS). The video frames may comprise pixels. A pixel may comprise the smallest controllable element of a video frame. The video frame may comprise bits for controlling each associated pixel. A portion of the bits for an associated pixel may control a luma value (e.g., light intensity) of each associated pixel. A portion of the bits for an associated pixel may control one or more chrominance value (e.g., color) of the pixel.

The content source 102 may receive requests for the content 130 from the encoder/transcoder 104, the packager 106, the computing device 110, or the CDN 108. The content source 102 may send content 130 to the encoder/transcoder 104 based on a request for video from the encoder/transcoder 104, the packager 106, the computing device 110, or the CDN 108. The content 130 may comprise uncompressed video data or a content stream such as an MPEG-SPTS.

The encoder/transcoder 104 may comprise an encoder, which may encode uncompressed video data received from the content source 102. The terms transcoder and encoder may be used interchangeably herein.

The encoder/transcoder 104 may receive content from the content source 102. The content may be in any one of a variety of formats, such as, for example, H.264, MPEG-4 Part 2, MPEG-2, analog or non-compressed formats such as HDMI, SDI, and the like. The encoder/transcoder 104 may convert the content from one video format to another video format, such as one format compatible with the playback devices of the service provider's users (e.g., computing device 110). The encoder/transcoder 104 may additionally segment the content into a plurality of segments. For example, content may be segmented into a series of 2-second segments.

When uncompressed video data is received, the encoder may encode the video (e.g., into a compressed format) using a compression technique prior to transmission. The content source 102 and the encoder/transcoder 104 may be co-located at a premises, located at separate premises, or associated with separate instances in the cloud. The encoder 104 may comprise any type of encoder including but not limited to: H.264/MPEG-AVC, H.265/MPEG-HEVC, MPEG-5 EVC, H.266/MPEG-VVC, AV1, VP9, Global motion compensation (GMC), etc. The encoder/transcoder 104 may transcode the content 130 into one or more output streams 140. The one or more output streams 140 may comprise video encoded with different resolutions and/or different bit rates.

The packager 106 may receive the content from the encoder/transcoder 104 or the content recording system 170. The packager 106 may receive the one or more output streams 140 from the encoder/transcoder 104. The packager 106 may determine how the content is to be segmented and put together for delivery to, and eventual playback by, the computing device 110 or harvester 173. As part of this process, the packager 106 may segment the content (such as in the event that the content has not yet been segmented) or may re-segment the content (such as in the event that the content had been previously segmented). The packager 106 may additionally insert one or more cues or markers (e.g., SCTE-35 or ID3 metadata, and the like) into the content segments at which one or more additional segments, such as segments comprising an advertisement, may be inserted by an upstream client, server, or logical module, such as the server 171.

The packager 106 may create a manifest file associated with the content. The manifest may comprise a DASH or HLS manifest. The manifest may comprise information describing various aspects of the associated content that may be useful for the computing device 110 to playback the content to store and retrieve the content. The manifest may indicate the availability of the portions comprising the content, the length of each portion, the number of portions, and/or the proper ordering of the portions necessary to cause playback of the content. The manifest may further include a network location (e.g., a hyper-text transfer protocol (HTTP) uniform resource locater (URL) link or other universal resource identifier (URI)) for each portion from which the content asset may be downloaded, accessed, or retrieved. The network location may indicate a location in CDN 108.

The network locations included within the manifest may indicate more than one location or source. The network location for portions corresponding to the content asset may reference a storage location while the network location for portions corresponding to an inserted advertisement may reference a location from outside the system 100 (e.g., at an advertising server). The manifest may include one or more manifest files and may describe multiple versions (e.g., different quality levels) of the content asset, including corresponding information on those portions. The manifest may describe multiple bit rate and/or resolution versions of the content asset. The manifest may be provided, such as by the server 120A-C, to the computing device 110 in response to a request to receive stored content. The computing device 110 may use the manifest files to determine the portions required to play the content asset or a portion of the content asset and download the required portions using the network locations specified in the manifest files.

The packager 106 may generate one or more ABR streams 150 in different ABR streaming formats. The one or more ABR streams 150 may comprise segments or fragments of video, audio, subtitles, etc., and the manifest. The manifest may indicate availability of the ABR stream and segments/fragments/portions and information for requesting the segments/fragments/portions (e.g., via a URL). The packager 106 may send the one or more ABR streams 150 to the CDN 108.

For linear content, the packager 106 may generate updated manifests for the content. A manifest for the linear content may indicate storage locations of the linear content segments available for downloading at a given time. After a period of time has lapsed, some content segments of the linear content may become unavailable (e.g., removal from short-term memory), whereas additional content segments packaged for the linear content may become available. The packager 106 may continue to generate these updated manifests for the linear content, which may indicate the linear content segments available at a given time for download by the computing device 110.

The CDN 108 may comprise one or more computing devices such as servers 120A, 120B, 120C that store content (e.g., the one or more ABR streams 150). The CDN 108 may receive a request for a content asset from the computing device 110. The request may be sent via HTTP. The CDN 108 may authorize/authenticate the request and/or the computing device 110 from which the request originated. The request for a content asset may comprise a request for a channel, a recorded program, a video on-demand asset, a website address, a video asset associated with a streaming service, and the like, and/or any combination of the foregoing. The CDN 108 may send the request to the content source 102, the encoder/transcoder 104, or the packager 106. The CDN 108 may send the requested content 160 to the computing device 110. The one or more servers 120A, 120B, 120C of the CDN 108 may serve the content asset 160 to the computing device 110.

The CDN 108 may group stored content segments based on the anticipated duration of playback of those segments and/or the likelihood of a particular bit rate version of content being requested by the computing device 110. The CDN 108 may store content that is requested more frequently and for a longer duration of playback together in a single storage container as compared with other bit rate versions of the content. The CDN 108 may store content that is more likely to be played for a short time in one or more storage containers. Further, in some cases the CDN 108 may store linear segments, such as those content segments being live streamed. Thus, the CDN 108 may store, on a short-term basis, the content segments associated with linear content.

The system 100 may comprise a content recording system 170. The content recording system 170 may include a server 171, storage 172, a harvester 173, or any combination thereof. The harvester 173, and optionally storage 172, may be in communication with the CDN 108 (e.g., via communication link 174), and may further be in communication with other upstream entities (e.g., the content source 102, the encoder 104, the packager 106, and the like) via the CDN 108.

The content recording system 170 may request and store manifests and content segments associated with a content. In some cases, the content may be a linear content, where content is available for display at a designated time. An example of a linear content may be a live-streamed content, or an originally streamed content. In some cases, the content may be associated with growing manifests, such as in cases where the content is interactive video on-demand (iVOD) content. In these cases, the manifest for content may be updated by appending additional information to the manifest as additional content segments are packaged and made available for playback.

The harvester 173 may send requests to the CDN 108 for manifests associated with a content. The harvester 173 may send a request for a manifest at a first time. The CDN 108 may send in response a manifest to the harvester 173. In some cases, the manifest may be a linear manifest. The manifest may be stored at the CDN 108. The manifest may include information indicative of storage locations for content segments associated with the content. The included information may be uniform resource locators (URLs) or Uniform Resource Indicators (URIs) corresponding to storage locations for the content segments (e.g., stored at the CDN 108).

The manifest may indicate storage locations for different versions of a content segment. The content segments indicated by the manifest may include content segments of different quality types. The manifest may indicate storage locations for a low quality version (e.g., a low bit rate segment), a middle quality version (e.g., a medium bit rate segment), a high quality version (e.g., a high bit rate segment), and the like. The manifest may indicate storage locations for audio or subtitle segments associated with a video segment. The manifest may indicate storage locations for different audio segments for a video segment, where the audio segments may include different languages (e.g., English, Spanish, and the like). As another example, the manifest may indicate storage locations for different subtitle segments associated with a video content (e.g., English subtitles, Spanish subtitles, and the like).

The harvester 173 may send requests for accessing the content segments indicated by the manifest. The harvester 173 may send these requests for access to the CDN 108. In some cases, the harvester 173 may request access to multiple content segments indicated in the manifest. The harvester 173 may request access to a video content segment, an associated audio content segment, an associated subtitle content segment, and the like. As another example, the harvester 173 may request a number of consecutive content segments indicated in the manifest. As another example, the harvester 173 may request different versions of a content segment, such as a combination of a low quality version, a medium quality version, or a high quality version of the content segment. The manifest may indicate storage locations for a number of content segment that, when aggregated, form a continuous content stream, which the harvester 173 may request access to. This may occur, for example, if an ABR ability of the harvester 173 is suspended or turned off. As another example, the harvester 173 may request access for each content segment indicated in the manifest, such that each content segment may be stored by the content recording system 170.

Figure 2:
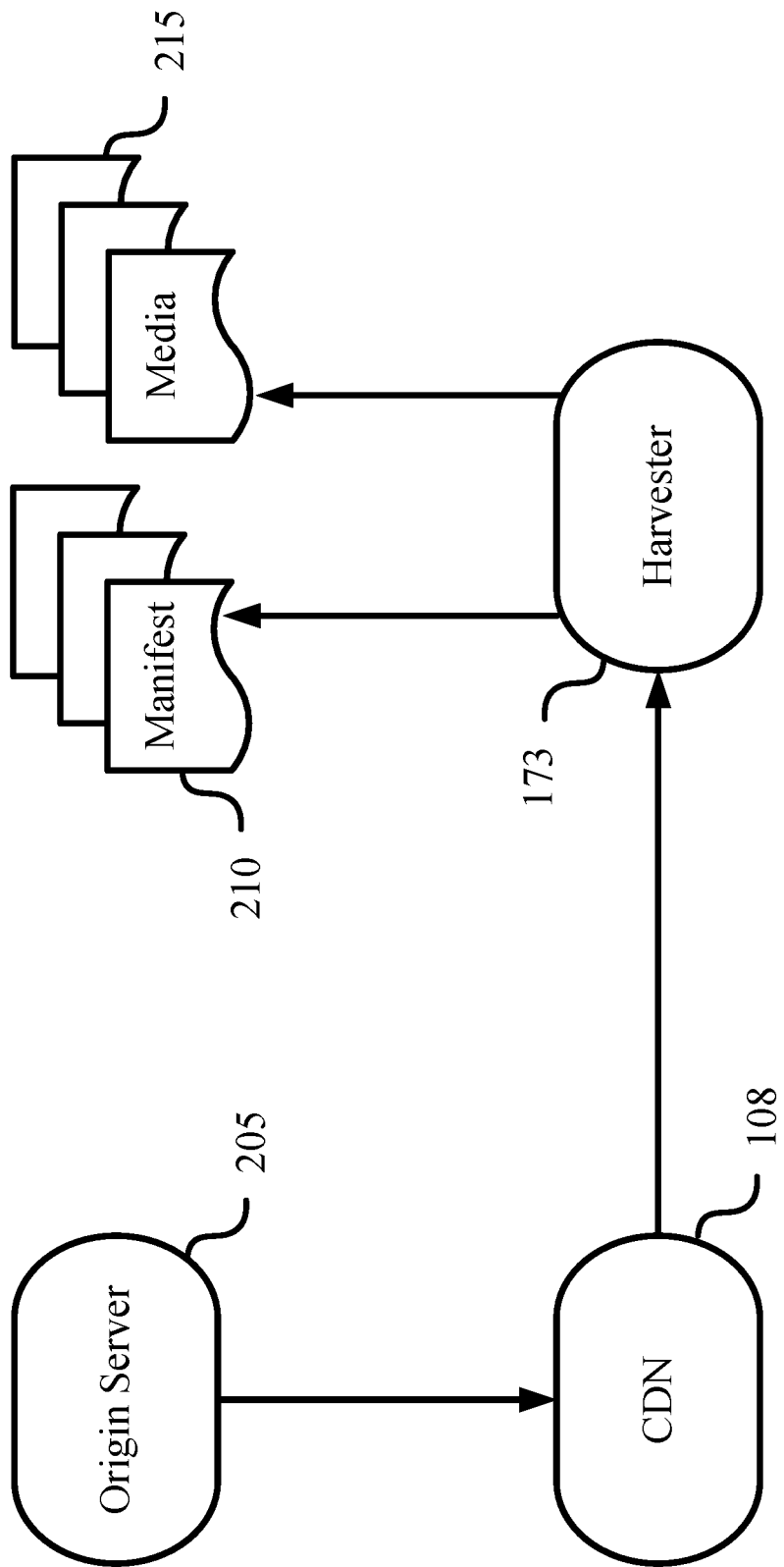
FIG. 2 shows an example workflow.

An example workflow is shown in FIG. 2. The origin server 205, which may include content source 102, transcoder 104, packager 106, or a combination thereof, may send content segments and manifests 210 associated with those content segments to the CDN 108. The CDN 108 may receive requests for the manifests from the harvester 173 and may send the manifests 210 to the harvester 173. The harvester 173 may cause the manifests 210 to be stored, such as by the server 171 of FIG. 1.

Storage 172 may store the content segments 215 accessed by the harvester 173. Storage 172 may access and retrieve the content segments 215 accessed by the harvester 173 (e.g., if the harvester 173 instructs storage 172 to access the content segments 215). In some cases, the content segments 215 are sent to storage 172 via the harvester 173. In some cases, storage 172 may receive the content segments 215 from the CDN 108 (e.g., based on instructions or requests received from the harvester 108). The storage 172 may comprise cloud object storage and/or one or more data storage devices, such as volatile memory (e.g., one or more of random access memory (RAM)), a hard disk drive, a network-attached storage (NAS), a storage area network (SAN), a serial advanced technology attachment (SATA)

drive, a solid state drive (SSD), or a non-volatile memory express (NVMe) drive upon which the content or portions thereof may be stored.

Likewise, in some cases storage 172 may also store the manifest 210 received by the CDN 108. In some cases the harvester 173 may send the manifest 210 to storage 172. In some cases, the manifest 210 may be sent to storage 172 via the CDN 108.

The harvester 173 may request multiple manifests for the content. The harvester 173 may send another request for a manifest for the content. The harvester 173 may wait a predefined time period, and then send another request. The CDN 108 may return an additional manifest associated with the content segment. The manifest may be sent without a request for the manifest, such as on a predefined time period with respect to the first request. The additional manifest may be the first manifest, such as in cases where the CDN 108 did not receive an updated manifest for the content (e.g., when the content is linear content). In some cases, the additional manifest may be a second manifest, which may indicate storage locations for content segments different from the content segments indicated by the first manifest. There may be partial overlap in the content segments of the first manifest and another manifest. The additional manifest may include content segments of the content at a later time compared to the first manifest. Earlier content segments of the first manifest may be removed from storage of the CDN (e.g., to be replaced with newer content segments packaged by the packager 106). In some cases, the content segments indicated by the first manifest and the manifest may include no overlap.

The harvester 173 may perform the functions above with respect to the first manifest. For example, the harvester 173 may cause storage 172 to store some or all of the content segments indicated by the additional manifest. Further, the harvester 173 may cause to be stored by storage 172 the additional manifest. This process may be repeated for a portion, or all, of the content. Thus, the content recording system 170 may store a number of manifests for the content. The number of manifests may include a number of different versions, or updated versions, of a manifest for the content. Further, the content recording system 170 may also store a number of content segments indicated by the number of manifests for the content.

The content recording system 170 may also include a server 171. The server 171 may be configured to generate virtual manifests for the content. The virtual manifests may facilitate the recreation of playback of the content at a time different from the original or live stream of the content. The term "virtual" is used because the virtual manifest may have adjusted characteristics to assist in recreating the original environment associated with original streaming of the content (e.g., at the time of the harvester 173 downloaded the content). The virtual manifest is intended to simulate playback as if playback of content were occurring during the original content stream instead of at a later time from a storage location. This virtualization may include uniform identifiers for accessing the content fragments encoded from the original content stream (e.g., which are stored and referred to by the manifest). This virtualization may include features of the manifest as well as of the server (e.g., server 171) used for later playback. The server may be programmed to interpret the manifest in a way to emulate the original playback. The virtual manifest may have added information (e.g., metadata as described further herein) and/or the server may have added information allowing for emulation of original conditions, such as network conditions and/or, a device, such as testing device 110-*a*. The server 171 may perform the virtualization for a variety of devices with different features to test playback and/or attempt to recreate errors from the original content. The server 171 may receive a request for a manifest associated with the content. The request may be received from a testing device 110-*a*, which may be an example of computing device 110. The testing device 110-*a* may be a playback device, and may include similar components and functions as that of the computing device 110.

The request for the manifest may include information indicative of the content. The request may include an identifier of the content, such as a title or name. The request may also include time information associated with the request. The request may include a generation time of the request. The request may include a tune time associated with the request. A tune time may be a time at which the testing device 110-*a* initially tunes to the content, which may be indicated by a generation or reception time of a first request for the content by the testing device 110-*a* (e.g., which may or may not be the generation or reception time of the request discussed above).

The server 171 may retrieve the manifests stored in storage 172 associated with the content. Storage 172 may store manifests for multiple contents. Storage 172 may store manifests for the requested content together (e.g., in a dedicated file). Storage 172 may send the manifests associated with the requested content to the server 171. The server 171 may send a request for the manifests to storage 172. In other cases, the server 171 may store the manifests for the content. Instead of storage 172 storing the manifests collected by the harvester 173, the server 171 may store the manifests collected by the harvester 173. In these cases, the server 171 may identify storage locations for the manifests within the server 171 based on the request from the testing device 110-*a*.

The server 171 may generate a virtual manifest for the content. A virtual manifest may include indications of storage locations for one or more content segments of the requested content. The storage locations indicated by the virtual manifest may be of storage 172 (e.g., as opposed to storage locations of the content segments stored by the CDN 108). The virtual manifest may include timing information, such as a generation time or storage time (e.g., in Coordinated Universal Time (UTC)). The virtual manifest may include playtimes for the content segments indicated in the virtual manifest. The virtual manifest may include a playtime for a content segment. The playtime may be in reference to a start time of the content (e.g., where the start time is 0:00). The virtual manifest may include storage location information for different versions of a content segment. The virtual manifest may include different bit rate versions of a content segment. The virtual manifest may include different versions of audio segments, subtitle segments, and the like, for overlaying with a video content segment.

The virtual manifest may be generated based on one or more of the manifests stored in storage 172. The stored manifests in storage 172 may be differentiated from one another based on a generation time or a download time. A first manifest stored in storage 172 may be associated with a start time of the content (e.g., with time 0:00 or a first UTC time). A second stored manifest for the content may include a generation or download time different with respect to the download or generation time of the first manifest (e.g., with time 0:15 or a second UTC time).

The server 171 may select a manifest from storage and may modify the stored manifest to generate the virtual manifest. The server 171 may determine a tune or start time for the requests received from the testing device 110-a for the content. The server 171 may receive a first request from the testing device 110-a. The server 171 may identify the time at which the first request is received or generated as the tune or start time for content by the testing device 110-a. In the case of responding to the first request, the server 171 may determine the manifest stored in storage 172 associated with the start time with the content (or a defined initial time, such as by a user), and select this manifest for the first virtual manifest.

The server 171 may identify the content segments indicated in the selected stored manifest and may generate the virtual manifest to indicate storage locations (e.g., in storage 172) of these content segments. The virtual manifest may include URLs or URIs for the content segments stored in storage 172. These content segments may be also indicated in the selected stored manifest (e.g., for storage locations in the CDN 108).

Additional information contained in the selected stored manifest may also be modified in the virtual manifest. If the selected stored manifest includes any universal time information, such as download or generated time information in UTC, the server 171 may modify these times to be based on the start or initial tune time of the testing device 110-a. This may mitigate errors experienced at the testing device 110-a (e.g., the testing device 110-a may experience an error when a received manifest indicates UTC times not approximate to the tune time of the testing device 110-a). The generated virtual manifest may be sent to the testing device 110-a.

The server 171 may receive other requests for the content from the testing device 110-a. The server 171 may determine the content segments to include another virtual manifest based on a time difference between the initial request received and another request received. The server 171 may determine a delta time between the initial request received and the another request. The server 171 may select a manifest stored in storage 172 based on the delta time between the requests. The manifests may be stored with a generation or download time (e.g., when packaged by the packager 106) with reference to an initial or start time of the content. The server 171 may select a manifest from the stored manifests based comparing the delta time of the another request with a delta time between a manifest and the manifest corresponding to the initial or start time of the content. Storage locations (e.g., in storage 172) of the content segments of the selected manifest may be indicated in the virtual manifest generated by the server 171. The virtual manifest generation process may be continued according to the requests received by the testing device 110-a, such as until the end of the content.

Figure 3:
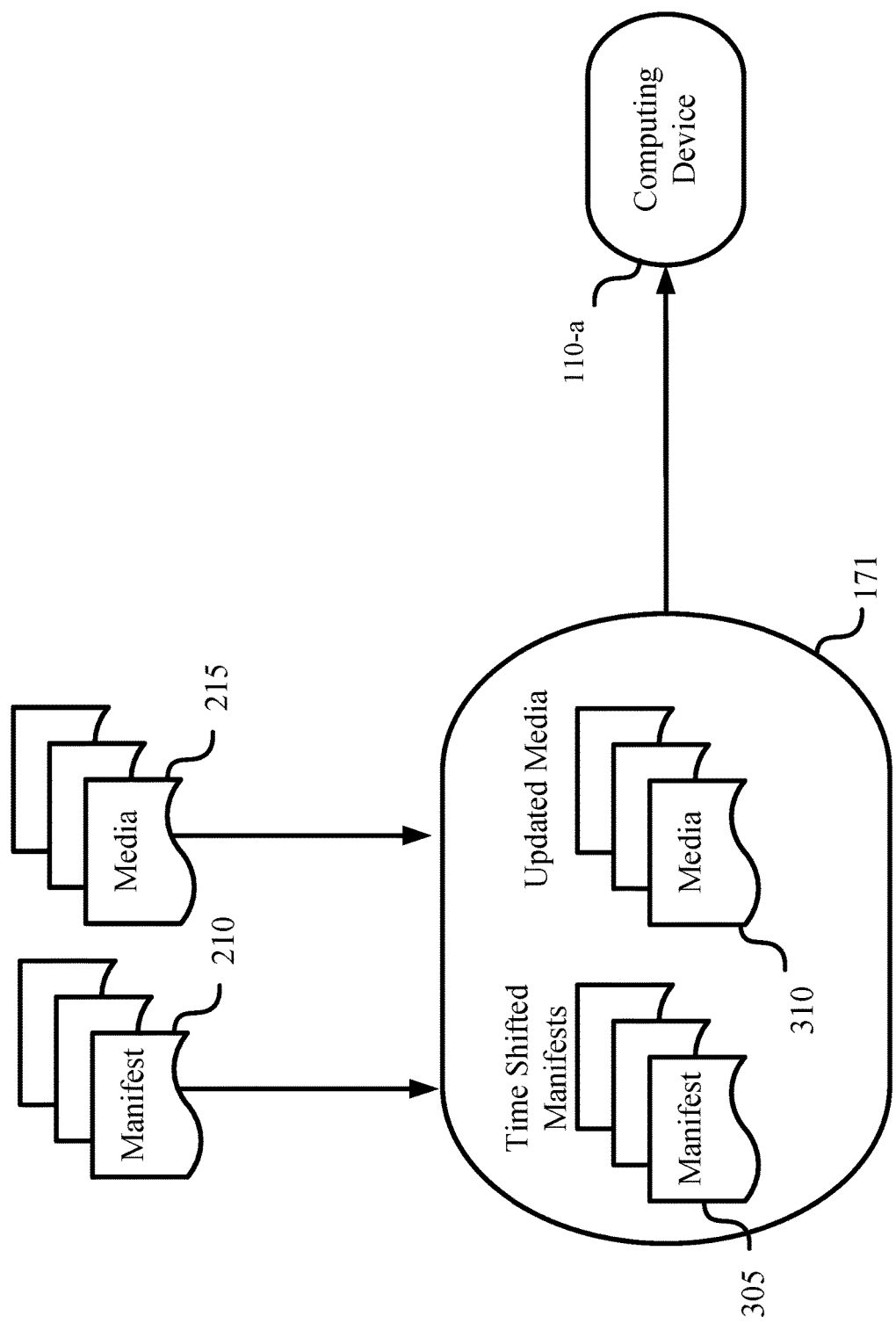
FIG. 3 shows an example workflow.

FIG. 3 shows an example workflow for the server 171. The server may receive the manifests 210, such as from the harvester 173 or from storage 172. The server 171 may, based on requests received form a testing device 110-a for accessing the content at a second transmission time subsequent to the first transmission time), generate virtual manifests 305, which may facilitate streaming the content as it streamed during the first transmission time. Likewise, the content segments 215 may also be updated as updated content segments 310 for facilitate streaming the content as if streamed during the first transmission time. For example, the content segments 310 can include updated time data associated with the second transmission (e.g., as opposed to the first transmission time). As another example, the content segments 310 can include updated storage locations (e.g., in storage 172).

The content recording system 170 may be used for recording live content and facilitating playback of the content to simulate or recreate playback of the content during its original or live stream. As an example, an original broadcast, such as for a live show, may be live streamed at a first or initial time. The harvester 173 may tune in to the original broadcast at the first or initial time, by requesting manifests for the live show. The harvester 173 may initiated recording or tuning to the original broadcast based on an automatic trigger (e.g., detection of a network condition, detection of a playback condition, receipt of an error or user complaint, a manual condition, and the like. The harvester 173 may receive manifests from the CDN 108 for the live show. The manifests are updated versions of each other (e.g., storage locations for more newly packaged content segments for the live show may be indicated in the most recent manifest, and storage locations for less recently packaged content segments may be removed). The harvester 173 may access, retrieve, or cause storage 172 to access or retrieve, some or all of the content segments indicated in the manifests. The received manifests may also be stored, either by storage 172 or the server 171.

Continuing the example, a user may wish to perform a quality assessment on the original broadcast of the live show. The testing device 110-a may be instructed to tune in to the live show, which may occur after the original broadcast is available. The testing device 110-a may request manifests from the content recording system (e.g., via server 171). The server 171 may generate virtual manifests for the content, which may indicate storage locations for the stored content of the live show. The server 171 may generate the virtual manifests to simulate the order and timing the manifests were generated and sent to the harvester 173 during the original or live stream of the show. Likewise, the manifest may make available the content segments, via the virtual manifests, that simulate or recreate the content segments made available to the harvester 173 during the original or live stream of the show. The testing device 110-a may play back the content segments (e.g., via a display), which a user may use to analyze the live show as if the live show was being played back during the original or live stream. The virtual manifests thus facilitate recreating conditions playback devices may have experienced during the original or live stream of the show, which may be assessed at a time later than the original or live broadcast.

As another example, the harvester 173 may continuously record each retrieved manifest variant. This may allow inspection of the manifest sequence that a particular client implemented during a problematic time, even if those manifests are no longer retrievable from the CDN 108. For each recorded manifest (e.g., first manifest, second manifest, and the like), the harvester 173 may also record the time at which each manifest was downloaded along with an overall tune start time (T0), which may be a start time of the content stream. The harvester 173 may also archive the live audio/video/subtitle segments, and record the available start/end times for each as advertised by a manifest. In some cases, during the archiving, the harvester 173 may lock ABR while recording the segments, or may record all available audio and video fragments in parallel.

Likewise, the server 171 may be able to handle client tuning at time (T1—current UTC), but behaving as if a client had tuned at time (T0). The server 171 may be signaled to start "Simulated Live" playback. The server 171 may compute a time delta, the difference in time between T1 and T0. Absolute times in the virtual manifest may be adjusted by above time delta. This avoids having to change the clock on the client device during test. Any UTC time element may be modified to indicate a virtual UTC server that returns a UTC time adjusted by the time delta. When a client attempts to download a manifest, the server 171 may select one of the archived manifests based on an elapsed time. The server 171 may provide 404 errors when asked to retrieve archived content segments that logically would not have been available to a client if tuning had started at time T0.

In some cases, download delays to simulate network performance, CDN loading, server location, etc., may be added. The delay values may be based on measurements made during the stream capture, or based on expected/possible network performance. This may include timing differences to simulate files that were not readily available in the CDN and had to be retrieved from the origin server. Network performance simulations may also include simulation of network errors, dropped requests, etc. that would typically cause the client to retry the segment or manifest download.

The actual content availability window may be duplicated for a client computing device. In these cases, a segment may be downloaded by the client computing device up to a predefined period (e.g., x seconds) after its reference is remove from the manifest.

Figure 4:
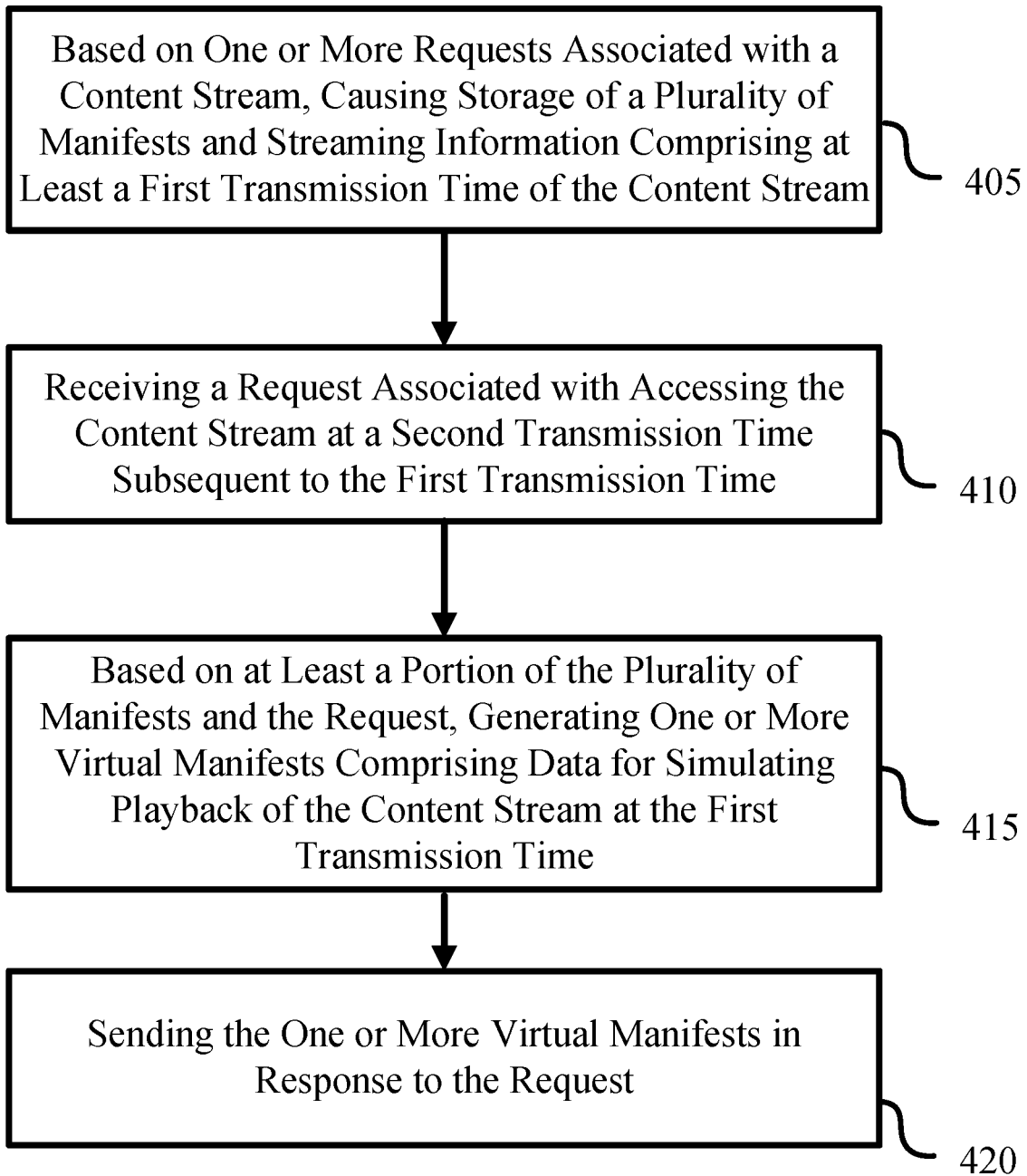
FIG. 4 shows an example method.

FIG. 4 shows an example method. The method may comprise a computer implemented method. The method may be implemented by one or more devices (e.g., computing devices, servers) and/or services disclosed herein, such as the devices, storage, and/or services of FIG. 1-3. One or more of the steps of the method may be implemented by the content recording system 170, such as by the harvester 173.

At Step 405, a plurality of manifests and streaming information comprising at least a first transmission time of a content stream may be stored. The storing may be based on one or more requests associated with the content stream. The first transmission time may be associated with a live or original broadcast of the content. The first transmission time may be an initial transmission time for the content stream, such as a stream start time. The plurality of manifests may be linear manifests.

At Step 410, a request associated with accessing the content stream at a second transmission time subsequent to the first transmission time may be received. The second transmission time may be an initial time for a computing device requesting access, such as a tune time for a computing device. The second transmission time may be associated with the request. The request is subsequent to one or more other requests for access to the content stream.

At Step 415, one or more virtual manifests including data for simulating playback or streaming of the content stream at the first transmission time may be generated. The generating may be based on at least a portion of the plurality of manifests and the request. A manifest of the plurality of manifests may be determined. A virtual manifest may be generated based on the determined manifest. A virtual manifest may be generated by modifying information of the determined manifest. The modified information may include storage location information for content segments of the content stream, timing information associated with the determined manifest, and the like. At Step 420, the one or more virtual manifests may be sent in response to the request.

Figure 5:
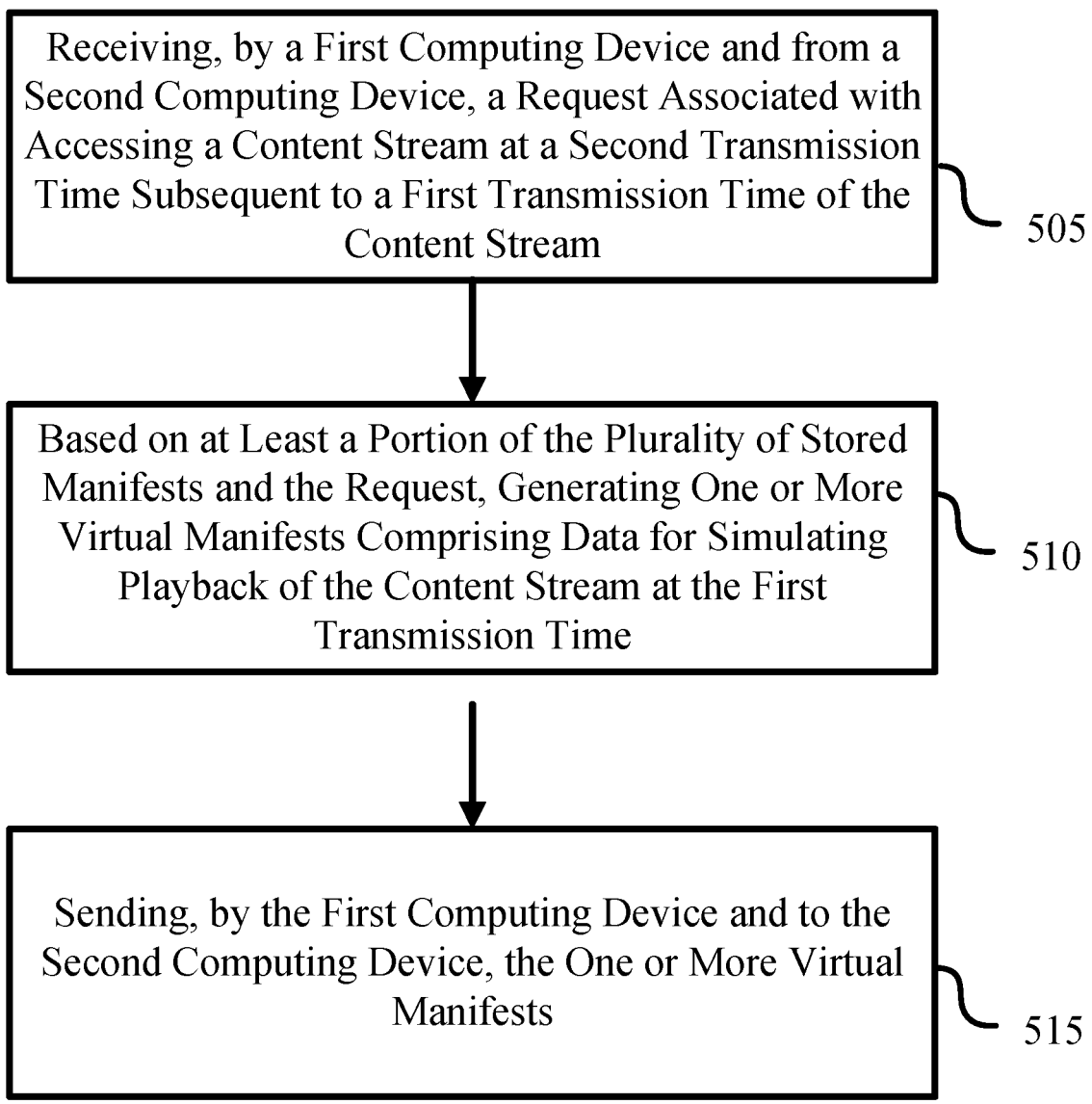
FIG. 5 shows an example method.

FIG. 5 shows an example method. The method may comprise a computer implemented method. The method may be implemented by one or more devices (e.g., computing devices, servers) and/or services disclosed herein, such as the devices, storage, and/or services of FIG. 1-3. One or more of the steps of the method may be implemented by the content recording system 170, such as by the harvester 173.

At Step 505, a request associated with accessing the content stream at a second transmission time subsequent to a first transmission time of the content stream may be received. The first transmission time may be associated with a live or original broadcast of the content. The first transmission time may be an initial transmission time for the content stream, such as a stream start time. The plurality of manifests may be linear manifests. The second transmission time may be an initial time for a computing device requesting access, such as a tune time for a computing device. The second transmission time may be associated with the request. The request may be subsequent to one or more other requests for access to the content stream.

At Step 510, one or more virtual manifests comprising data for simulating playback or streaming of the content stream at the first transmission time may be generated. The generating may be based on at least a portion of the plurality of stored manifests and the request. A manifest of the plurality of stored manifests may be determined. A virtual manifest may be generated based on the determined manifest. A virtual manifest may be generated by modifying information of the determined manifest. The modified information may include storage location information for content segments of the content stream, timing information associated with the determined manifest, and the like. At Step 515, the one or more virtual manifests may be sent.

Figure 6:
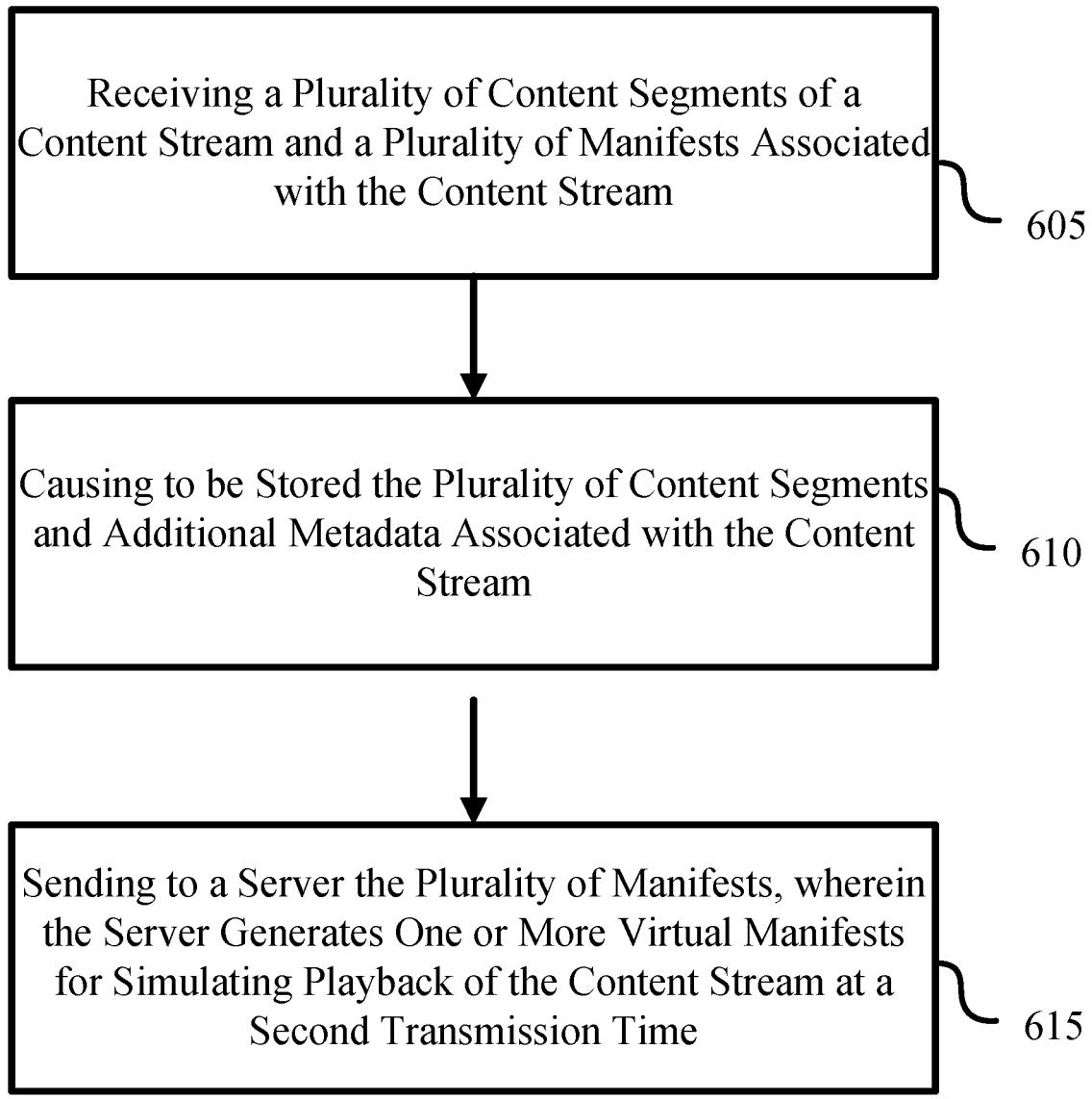
FIG. 6 shows an example method.

FIG. 6 depicts an example method. The method may comprise a computer implemented method. The method may be implemented by one or more devices (e.g., computing devices, servers) and/or services disclosed herein, such as the devices, storage, and/or services of FIG. 1-3. One or more of the steps of the method may be implemented by the content recording system 170, such as by the harvester 173.

At Step 605, a plurality of content segments of a content stream and a plurality of manifests associated with the content stream may be received. The plurality of manifests may be linear manifests. The plurality of content segments may be different versions of a content segment of the content stream, such as different bit rate versions, different language versions, different subtitle versions, and the like.

At Step 610, the plurality of content segments and additional metadata associated with the content stream may be caused to be stored. The additional metadata may include a first transmission time of the content stream and a generation time for each of the plurality of manifests. Storage of the content segments may include recording of the content segments.

At Step 615, the plurality of manifests may be sent to a server. The server may generate one or more virtual manifests for simulating playback or streaming of the content stream. The second transmission time may be an initial time for a computing device requesting access, such as a tune time for a computing device. The second transmission time may be associated with the request. The request may be subsequent to one or more other requests for access to the content stream.

Figure 7:
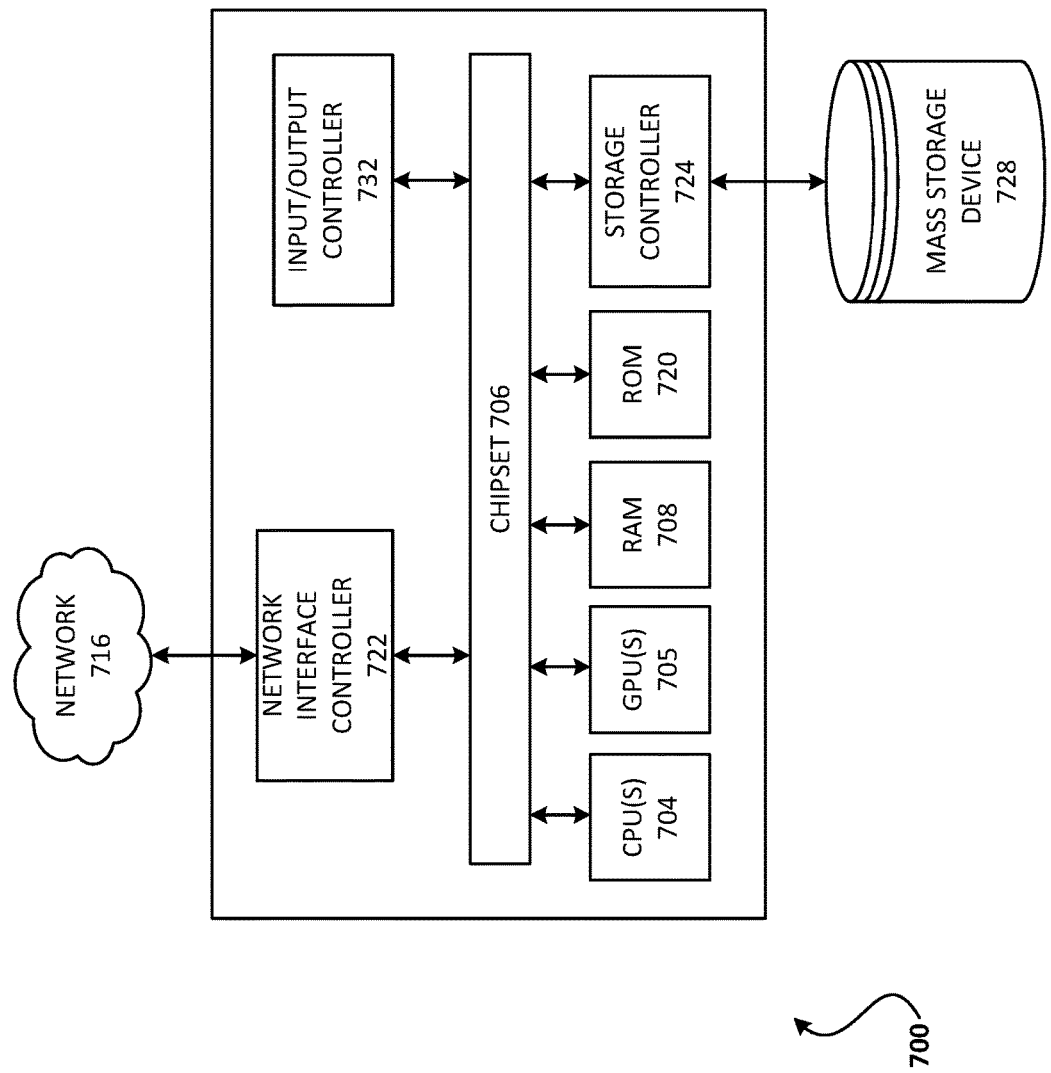
FIG. 7 shows an example computing device.

FIG. 7 depicts a computing device 700 that may be used in various aspects, such as the servers, encoders, computing device, and other devices depicted in FIG. 1. With regard to the example architectures of FIG. 1, the devices may each be implemented in an instance of a computing device 700 of FIG. 7. The computer architecture shown in FIG. 7 shows a conventional server computer, workstation, desktop computer, laptop, tablet, network appliance, PDA, e-reader, digital cellular phone, or other computing node, and may be utilized to execute any aspects of the computers described herein, such as to implement the methods described in relation to FIGS. 4-6.

The computing device 700 may include a baseboard, or "motherboard," which is a printed circuit board to which a multitude of components or devices may be connected by way of a system bus or other electrical communication paths. One or more central processing units (CPUs) 704 may operate in conjunction with a chipset 706. The CPU(s) 704 may be standard programmable processors that perform arithmetic and logical operations necessary for the operation of the computing device 700.

The CPU(s) 704 may perform the necessary operations by transitioning from one discrete physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits including registers, adders-subtractors, arithmetic logic units, floating-point units, and the like.

The CPU(s) 704 may be augmented with or replaced by other processing units, such as GPU(s) 705. The GPU(s) 705 may comprise processing units specialized for but not necessarily limited to highly parallel computations, such as graphics and other visualization-related processing.

A chipset 706 may provide an interface between the CPU(s) 704 and the remainder of the components and devices on the baseboard. The chipset 706 may provide an interface to a random access memory (RAM) 708 used as the main memory in the computing device 700. The chipset 706 may further provide an interface to a computer-readable storage medium, such as a read-only memory (ROM) 720 or non-volatile RAM (NVRAM) (not shown), for storing basic routines that may help to start up the computing device 700 and to transfer information between the various components and devices. ROM 720 or NVRAM may also store other software components necessary for the operation of the computing device 700 in accordance with the aspects described herein.

The computing device 700 may operate in a networked environment using logical connections to remote computing nodes and computer systems through local area network (LAN) 716. The chipset 706 may include functionality for providing network connectivity through a network interface controller (NIC) 722, such as a gigabit Ethernet adapter. A NIC 722 may be capable of connecting the computing device 700 to other computing nodes over a network 716. It should be appreciated that multiple NICs 722 may be present in the computing device 700, connecting the computing device to other types of networks and remote computer systems.

The computing device 700 may be connected to a mass storage device 728 that provides non-volatile storage for the computer. The mass storage device 728 may store system programs, application programs, other program modules, and data, which have been described in greater detail herein. The mass storage device 728 may be connected to the computing device 700 through a storage controller 724 connected to the chipset 706. The mass storage device 728 may consist of one or more physical storage units. A storage controller 724 may interface with the physical storage units through a serial attached SCSI (SAS) interface, a SATA interface, a fiber channel (FC) interface, or other type of interface for physically connecting and transferring data between computers and physical storage units.

The computing device 700 may store data on a mass storage device 728 by transforming the physical state of the physical storage units to reflect the information being stored. The specific transformation of a physical state may depend on various factors and on different implementations of this description. Examples of such factors may include, but are not limited to, the technology used to implement the physical storage units and whether the mass storage device 728 is characterized as primary or secondary storage and the like.

For example, the computing device 700 may store information to the mass storage device 728 by issuing instructions through a storage controller 724 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 700 may further read information from the mass storage device 728 by detecting the physical states or characteristics of one or more particular locations within the physical storage units.

In addition to the mass storage device 728 described herein, the computing device 600 may have access to other computer-readable storage media to store and retrieve information, such as program modules, data structures, or other data. It should be appreciated by those skilled in the art that computer-readable storage media may be any available media that provides for the storage of non-transitory data and that may be accessed by the computing device 700.

By way of example and not limitation, computer-readable storage media may include volatile and non-volatile, transitory computer-readable storage media and non-transitory computer-readable storage media, and removable and non-removable media implemented in any method or technology. Computer-readable storage media includes, but is not limited to, RAM, ROM, erasable programmable ROM ("EPROM"), electrically erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage, other magnetic storage devices, or any other medium that may be used to store the desired information in a non-transitory fashion.

A mass storage device, such as the mass storage device 728 depicted in FIG. 7, may store an operating system utilized to control the operation of the computing device 700. The operating system may comprise a version of the LINUX operating system. The operating system may comprise a version of the WINDOWS SERVER operating system from the MICROSOFT Corporation. According to further aspects, the operating system may comprise a version of the UNIX operating system. Various mobile phone operating systems, such as IOS and ANDROID, may also be utilized. It should be appreciated that other operating systems may also be utilized. The mass storage device 728 may store other system or application programs and data utilized by the computing device 700.

The mass storage device 728 or other computer-readable storage media may also be encoded with computer-executable instructions, which, when loaded into the computing device 700, transforms the computing device from a general-purpose computing system into a special-purpose computer capable of implementing the aspects described herein. These computer-executable instructions transform the computing device 700 by specifying how the CPU(s) 704 transition between states, as described herein. The computing device 700 may have access to computer-readable storage media storing computer-executable instructions, which, when executed by the computing device 700, may perform the methods described in relation to FIGS. 4-6.

A computing device, such as the computing device 700 depicted in FIG. 7, may also include an input/output controller 732 for receiving and processing input from a number of input devices, such as a keyboard, a mouse, a touchpad, a touch screen, an electronic stylus, or other type of input device (e.g., a remote control via infrared, Bluetooth, and the like). Similarly, an input/output controller 732 may provide output to a display, such as a computer monitor, a flat-panel display, a digital projector, a printer, a plotter, or other type of output device. It will be appreciated that the computing device 700 may not include all of the components shown in FIG. 7, may include other components that are not explicitly shown in FIG. 7, or may utilize an architecture completely different than that shown in FIG. 7.

As described herein, a computing device may be a physical computing device, such as the computing device 700 of FIG. 7. A computing node may also include a virtual machine host process and one or more virtual machine instances. Computer-executable instructions may be executed by the physical hardware of a computing device indirectly through interpretation and/or execution of instructions stored and executed in the context of a virtual machine.

It is to be understood that the methods and systems described herein are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Components are described that may be used to perform the described methods and systems. When combinations, subsets, interactions, groups, etc., of these components are described, it is understood that while specific references to each of the various individual and collective combinations and permutations of these may not be explicitly described, each is specifically contemplated and described herein, for all methods and systems. This applies to all aspects of this application including, but not limited to, operations in described methods. Thus, if there are a variety of additional operations that may be performed it is understood that each of these additional operations may be performed with any specific embodiment or combination of embodiments of the described methods.

The present methods and systems may be understood more readily by reference to the following detailed description of preferred embodiments and the examples included therein and to the Figures and their descriptions.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described herein with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, may be implemented by computer program instructions. These computer program instructions may be loaded on a general-purpose computer, special-purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that may direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

The various features and processes described herein may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto may be performed in other sequences that are appropriate. For example, described blocks or states may be performed in an order other than that specifically described, or multiple blocks or states may be combined in a single block or state.

The example blocks or states may be performed in serial, in parallel, or in some other manner. Blocks or states may be added to or removed from the described example embodiments. The example systems and components described herein may be configured differently than described. For example, elements may be added to, removed from, or rearranged compared to the described example embodiments.

It will also be appreciated that various items are illustrated as being stored in memory or on storage while being used, and that these items or portions thereof may be transferred between memory and other storage devices for purposes of memory management and data integrity. Alternatively, in other embodiments, some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the modules, systems, and data structures may also be stored (e.g., as software instructions or structured data) on a computer-readable medium, such as a hard disk, a memory, a network, or a portable media article to be read by an appropriate device or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its operations be performed in a specific order. Accordingly, where a method claim does not actually recite an order to be followed by its operations or it is not otherwise specifically stated in the claims or descriptions that the operations are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of embodiments described in the specification.

It will be apparent to those skilled in the art that various modifications and variations may be made without departing from the scope or spirit of the present disclosure. Other embodiments will be apparent to those skilled in the art from consideration of the specification and practices described herein. It is intended that the specification and example figures be considered as exemplary only, with a true scope and spirit being indicated by the following claims.

What is claimed:

1. A method comprising:
    based on one or more requests associated with content, causing storage of a plurality of manifests and streaming information comprising at least a first transmission time of the content;
    receiving, from a computing device, a request associated with accessing the content at a second transmission time subsequent to the first transmission time;
    based on at least a portion of the stored plurality of manifests and the request, generating one or more virtual manifests comprising data for simulating streaming of the content at the first transmission time; and
    sending the one or more virtual manifests to the computing device.

2. The method of claim 1, further comprising:
    causing storage of a plurality of versions of a content segment of the content indicated by the plurality of manifests, and wherein the one or more virtual manifests indicate storage locations for the stored plurality of versions of the content segment.

3. The method of claim 2 wherein the plurality of versions comprises a plurality of bit rate versions.

4. The method of claim 2 wherein the plurality of versions comprises a plurality of language versions.

5. The method of claim 1, further comprising:
    based on the first transmission time and the second transmission time, determining a manifest of the plurality of stored manifests, wherein generating the one or more virtual manifests is based on the determined manifest.

6. The method of claim 1, further comprising:
    determining a time difference between the second transmission time and an initial transmission time associated with an initial request associated with accessing the content, wherein generating the one or more virtual manifests is based on the time difference.

7. The method of claim 1, wherein the plurality of manifests comprise linear stream manifests or growing manifests.

8. A method comprising:
    receiving, by a first computing device and from a second computing device, a request associated with accessing content at a second transmission time subsequent to a first transmission time of the content;
    based on at least a portion of a plurality of stored manifests and the request, generating one or more virtual manifests comprising data for simulating streaming of the content at the first transmission time; and
    sending, by the first computing device and to the second computing device, the one or more virtual manifests.

9. The method of claim 8, further comprising:
    based on the first transmission time and the second transmission time, determining a manifest of the plurality of stored manifests, wherein generating the one or more virtual manifests is based on the determined manifest.

10. The method of claim 8, further comprising:
    determining a time difference between the second transmission time and an initial transmission time associated with an initial request for accessing the content by the second computing device, wherein generating the one or more virtual manifests is based on the time difference.

11. The method of claim 10, further comprising:
determining a manifest of the plurality of stored manifests, wherein generating the one or more virtual manifests comprises modifying streaming information of the determined manifest.

12. The method of claim 11, wherein the streaming information comprises storage locations for one or more content segments of the content.

13. The method of claim 12, wherein the one or more content segments comprise a plurality of versions of a content segment of the content.

14. The method of claim 8, wherein the plurality of stored manifests comprise stored linear manifests.

15. A method comprising:
receiving a plurality of content segments of a content and a plurality of manifests associated with the content;
causing to be stored the plurality of content segments and additional metadata associated with the content; and
sending to a server the plurality of manifests, wherein the server generates one or more virtual manifests for simulating streaming of the content at a second transmission time.

16. The method of claim 15, wherein the additional metadata comprises a first transmission time of the content and a generation time for each of the plurality of manifests.

17. The method of claim 15, wherein the plurality of content segments comprise different versions of a content segment.

18. The method of claim 17, wherein the content segment comprises a video segment, and the different versions of the content segment comprise different bitrate versions.

19. The method of claim 17, wherein the content segment comprises an audio segment or subtitle segment, and wherein the different versions comprise different language versions.

20. The method of claim 15, wherein the plurality of manifests comprise linear manifests or growing manifests.

* * * * *